United States Patent
Galarneau et al.

[11] Patent Number: 5,323,267
[45] Date of Patent: Jun. 21, 1994

[54] HIGH POWER LASER BEAM SAMPLER

[75] Inventors: Pierre Galarneau, Cap Rouge; Pierre Langlois, Ste-Catherine-de-la-Jacques-Cartier; Michel Belanger, Silliery; Julie Frechette, Charlesbourg; Jean-Marie Trudeau, St-Nicolas, all of Canada; Marie Cote, Tucson, Ariz.

[73] Assignee: Gentec Inc., Ste-Foy, Canada

[21] Appl. No.: 815,960

[22] Filed: Jan. 2, 1992

[51] Int. Cl.$^5$ ............................ G02B 1/00; G02B 5/18
[52] U.S. Cl. .................................... 359/574; 359/569; 359/350
[58] Field of Search ................ 359/1, 3, 15, 27, 558, 359/566, 571, 574, 350, 569; 372/102, 109

[56] References Cited

U.S. PATENT DOCUMENTS

| | | | |
|---|---|---|---|
| 3,574,462 | 4/1971 | Harvey | 356/302 |
| 3,861,801 | 1/1975 | Peters et al. | 359/572 |
| 4,426,130 | 1/1984 | Knop | 359/572 |
| 4,440,839 | 4/1984 | Mottier | 430/1 |
| 4,512,638 | 4/1985 | Sriram et al. | 359/352 |
| 4,806,454 | 2/1989 | Yoshida et al. | 359/558 X |
| 5,113,286 | 5/1992 | Morrison | 359/569 |
| 5,238,785 | 8/1993 | Ohkura et al. | 359/566 X |

Primary Examiner—William L. Sikes
Assistant Examiner—David R. Parsons
Attorney, Agent, or Firm—Dvorak and Traub

[57] ABSTRACT

A beam sampler comprises a substrate made of highly transparent fused silica or zinc selenide, both capable of sustaining high power laser beams. The substrate defines an outer surface through which the light beam being sampled propagates. A sinusoidal diffracting relief is etched on this outer surface directly into the light-propagating material of the substrate. When a light beam propagates through the outer surface of the substrate, the three-dimensional diffracting relief extracts from this light beam at least one pair of low power beam samples.

7 Claims, 2 Drawing Sheets

HIGH POWER LASER BEAM SAMPLER

BACKGROUND OF THE INVENTION

1. Field of the Invention

The present invention relates to a beam sampler made of a highly transparent substrate. A three-dimensional diffracting relief is etched directly onto the substrate to extract from a light beam being sampled at least one pair of low power beam samples.

2. Brief Description of the Prior Art

As the applications of high-power lasers increase, the need for a complete monitoring of laser beam characteristics becomes increasingly crucial. Those skilled in the art will appreciate that beam-sampling devices represent one of the key technologies in such beam monitoring.

Obviously, real-time operation and pulsed-laser compatibility require a real sampler as opposed to a time sampler, since the latter provides only average values.

A prior art light beam sampler comprises a substrate of transparent light-propagating material defining two opposite and substantially parallel planar surfaces through which the laser beam to be sampled propagates in a direction generally perpendicular to these surfaces. A coating of resinous substance is applied to the one of the two planar surfaces through which the laser beam leaves the substrate. A diffracting relief is recorded on the outer face of the resinous coating to extract from the laser beam at least one pair of low power beam samples. The characteristics of the beam samples conform with those of the sampled laser beam whereby these samples can be analyzed to determine the different parameters of the laser beam.

Although the above described prior art sampler is capable of sustaining laser beams at low power levels, the resinous coating substance deteriorates rapidly when submitted to high power laser beams. Also, the performance of the resinous coating is affected by the environmental conditions such as the temperature and humidity. A further drawback is the limited spectral region in which the resinous coating substance operates satisfactorily.

OBJECTS OF THE INVENTION

An object of the present invention is therefore to eliminate the above mentioned drawbacks of the prior art.

Another object of the present invention is to provide a beam sampling device comprising a substrate made of light-propagating material capable of sustaining a high power light beam. This substrate defines an outer surface on which a three-dimensional diffracting relief is directly engraved to extract a portion of the laser beam without perturbing the remaining transmitted portion of that beam.

SUMMARY OF THE INVENTION

More specifically, in accordance with the present invention, there is provided a light beam sampling device comprising:

a substrate made of light-propagating material capable of sustaining a high power light beam, this substrate defining an outer surface, and the light beam being sampled propagating through this outer surface; and a three-dimensional diffracting relief engraved on the outer surface of the substrate directly into the light-propagating material, this diffracting relief comprising means for extracting from the light beam propagating through the outer surface at least one pair of low power beam samples.

The incident light beam can obviously be a laser beam. The substrate may then be made of highly transparent fused silica or highly transparent zinc selenide. Using one of these two materials, a high power laser beam will not deteriorate the substrate, including the three-dimensional relief.

In accordance with a preferred embodiment of the beam sampling device according to the invention, the three-dimensional diffracting relief is etched on the outer surface of the substrate.

Advantageously, the three-dimensional diffracting relief is a sinusoidal relief.

The objects, advantages and other features of the present invention will become more apparent upon reading of the following non restrictive description of a preferred embodiment thereof, given by way of example only with reference to the accompanying drawings.

DETAILED DESCRIPTION OF THE PREFERRED EMBODIMENT

Figure 1:
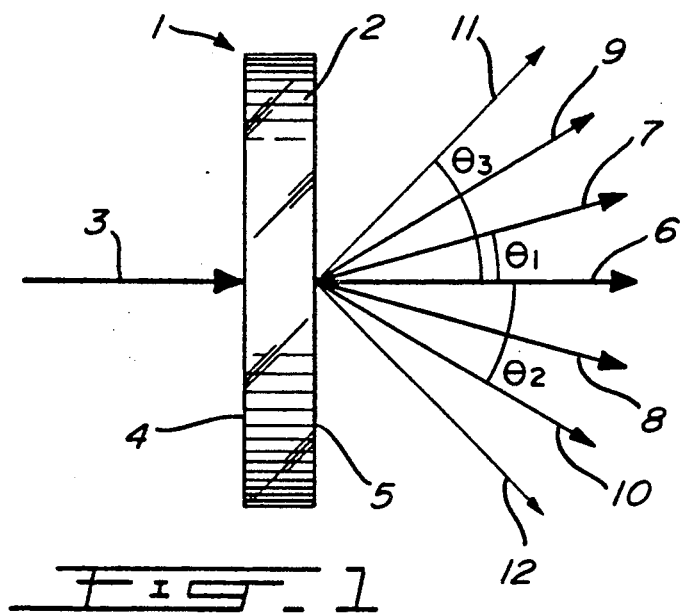
FIG. 1 is a schematic plan view of the preferred embodiment of the beam sampler in accordance with the present invention, illustrating its operation.

In the different figures of the appended drawings, the beam sampler in accordance with the present invention is generally identified by the reference numeral 1.

The sampler 1 is simply formed of a solid, highly transparent and substantially flat substrate 2. Examples of materials suitable to construct the sampler are UV (ultraviolet) grade fused silica ($SiO_2$), and zinc selenide (ZnSe). These materials are capable of sustaining high power laser beam. Although fused silica and zinc selenide are given as non limitative examples, other types of materials, having similar characteristics, can eventually be used.

In operation, an incident high power laser beam 3 to be sampled penetrates the substrate 2 through a planar surface 4 thereof. The laser beam 3 then propagates through the substrate 2 and leaves it through another surface 5 thereof, opposite and substantially parallel to the first surface 4, to produce a transmitted high power laser beam 6.

A three-dimensional diffracting relief is engraved, more specifically etched on the surface 5 directly in the fused silica or zinc selenide. As the diffracting relief is etched directly in the material of the substrate 2, it can also sustain the high power laser beam 3.

Figure 2:
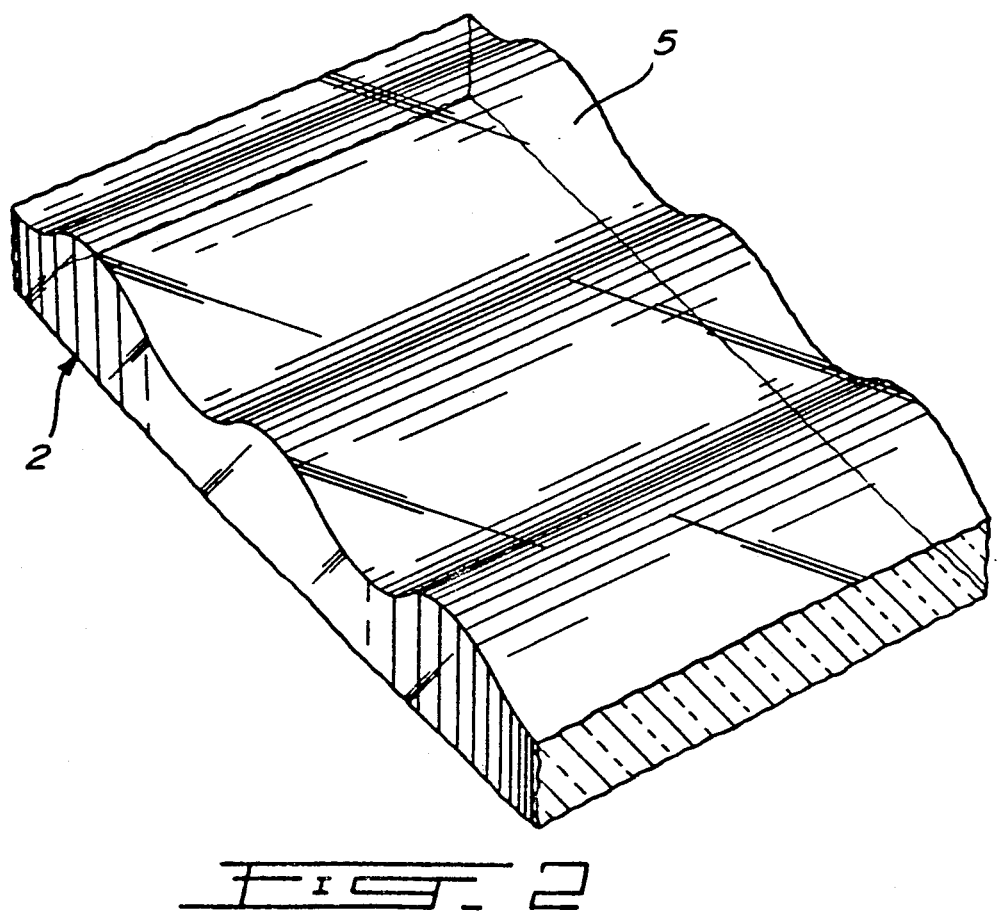
FIG. 2 is an enlarged, perspective view of the three-dimensional diffracting relief engraved on the outer surface of the substrate of the preferred embodiment of FIG. 1.

An example of diffracting relief is illustrated in FIG. 2. As can be seen, this relief is sinusoidal. More specifically, a cross section of the substrate 2 defined by an horizontal plane in FIGS. 1 and 2 will show the sinusoidal configuration of the relief. As can be appreciated by those skilled in the art, the diffracting relief of FIG. 2 is only an example and many other configurations of relief can be contemplated.

Figure 3:
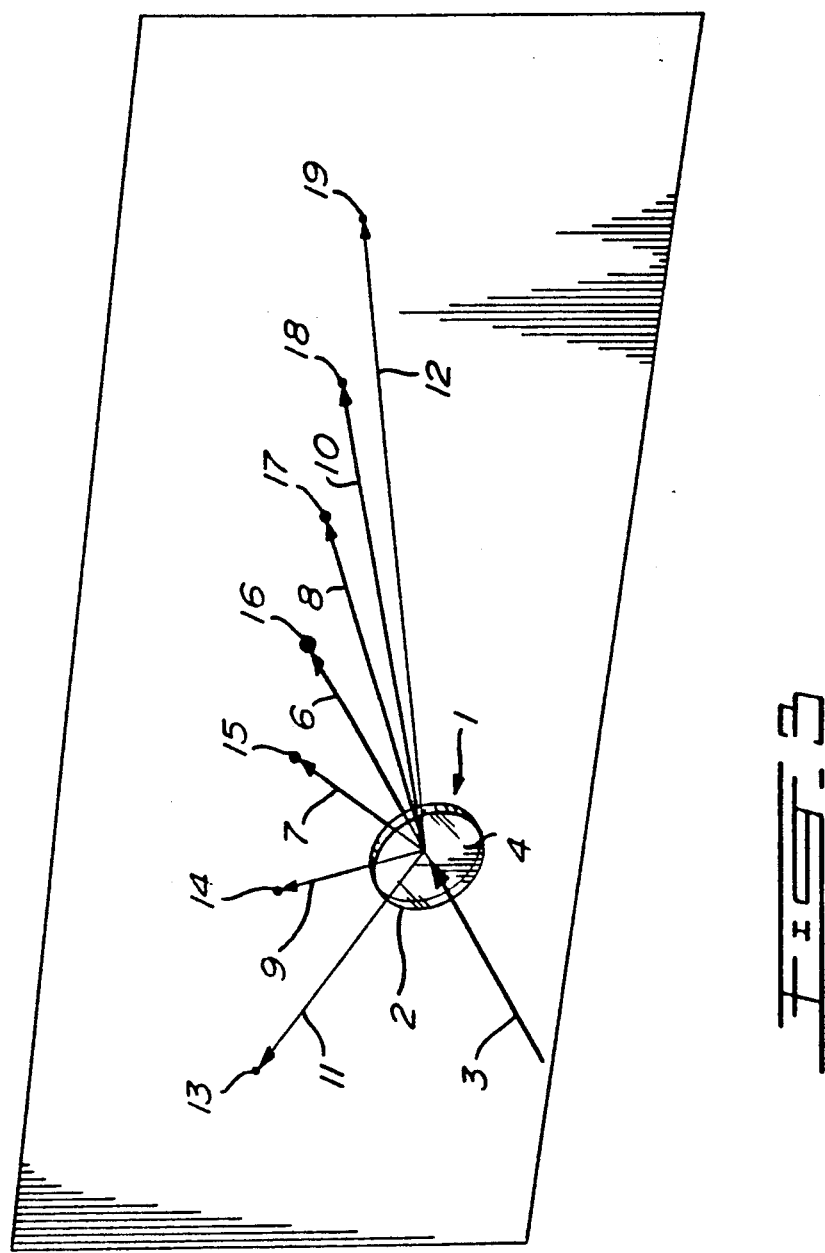
FIG. 3 is a perspective view showing the laser beam sampling carried out by the preferred embodiment of the beam sampler.

As the laser beam passes through the surface 5, the sinusoidal relief will diffract it to extract from the transmitted high power laser beam 6, pairs of low power beam samples 7,8; 9,10; and 11,12. This phenomenon is well known in the art and accordingly will not be further described in the present specification. The different parameters and characteristics of the transmitted laser beam 6 are also found in the beam samples 7-12. In FIGS. 1 and 3, the beam samples 7 and 8 are first order samples, the beam samples 9 and 10 are second order samples, and the beam samples 11 and 12 are third order samples.

As can be seen in FIGS. 1 and 3, the incident 3 and transmitted 6 laser beams propagate generally in the same direction, substantially perpendicular to the planar surface 4 and to the engraved surface 5.

The angular distribution of the different diffraction orders is given by the following relationship:

$$\Theta_n = \arcsin(n\lambda/\Lambda) \quad (1)$$

where n is the diffracted order, $\theta_n$ is the angle with respect to the transmitted beam 6, $\lambda$ is the wavelength of the incident 3 and transmitted 6 laser beams, and $\Lambda$ is the period of the sinusoidal relief. With the preferred embodiment of the invention, the first order angle $\theta_1$ (FIG. 1) may vary between 50° and 120°. Equation (1) demonstrates that, for small angles $\theta_n$, the second and third order angles $\theta_2$ and $\theta_3$ are nearly two times and three times larger than the angle $\theta_1$, respectively.

For low sampling factor, the relations between the intensity of the different diffraction orders may be expressed as $$\eta_n \propto \eta^n_1 \quad (2)$$

where $\eta_n$ is the diffraction efficiency of the $n^{th}$ order of diffraction. Regarding the value of $\eta_1$, it may be adjusted by means of simple modifications to the recorded relief. In practice, $0.05\% \leq \eta^1 \leq 10\%$.

For example, if the ratio of the power of each beam sample 7 and 8 to the power of the transmitted laser beam 6 has a value Y, assuming negligible Fresnel losses the ratio of the power of each beam sample 9 and 10 to the power of the beam 6 will be approximately $Y^2/4$ for a sinusoidal relief, and the ratio of the power of each beam sample 11 and 12 to the power of the transmitted beam 6 will be approximately $Y^3$. This is illustrated in FIG. 3 by the dimensions of the spots 13-19 produced by the beam 6 and beam samples 7-12 on a background surface remote from but parallel to the substrate 2 of the sampler 1 according to the invention.

As mentioned in the foregoing description, the diffracting relief is etched on the surface 5 directly into the material of the substrate. For example, when high-quality fused silica is used, the fabrication process starts with application of a photoresistive resinous coating to the surface 5 of the fused silica substrate 2. A diffracting pattern 5 is recorded within the photoresistive resinous coating and this coating is then developed to obtain the desired relief thereon. After development, the relief is transferred to the fused silica surface 5 by projecting ions for radicals on the photoresistive coating. Although this type of etching process is suitable to produce efficiently the thin relief required, other types of etching processes can also be envisaged.

The sampler in accordance with the present invention offers, among others, the following advantages:

- ease in obtaining a low sampling factor that can vary between 1/10 and 1/2000 on first order (ratio of the power of the beam samples 7 and 8 to the power of the transmitted beam 6);
- weak unusable losses;
- ability to preserve in the beam samples information on the spatial profile of the transmitted laser beam 6;
- a high damage threshold (ability to sustain high average power, high peak power density and high-energy pulses; at 1.064 μm, the sampler has shown a damage threshold as high as 86.3 J/cm² with 10 nsec pulses);
- ability to preserve a cartesian beam (no deviation of the transmitted beam when the incident beam is perpendicular to the surface 4 of the substrate 2);
- easy alignment as well as complete independence from beam position and/or diameter;
- production of calibrated replicas of the transmitted beam 6; and
- a very low sensitivity to light polarization (with low diffraction angle, the sampling factor is not affected by polarization), to temperature variation, and generally to the environmental conditions (various conditions of temperature and humidity are expected in industrial environments);
- no distortion of the transmitted beam when compared to the incident beam; and
- no effect on the beam polarization.

Beam samplers in accordance with the present invention were proved to perform properly at 1.064 μm for average power levels up to 1 kW. The relative polarization sensitivity was lower than 1.0% for diffraction angles lower than 10°. Using tabulated value of $1.28 \times 10^{-5}/°C$. for $d\eta/dT$, a relative sensitivity on temperature variation $[(1/\eta)d\eta/dT]$ as low as $5.7 \times 10^{-5}/°C$. was obtained.

Beam samples operation satisfactorily at 2.1 μm, 1.064 μm, 694.3 nm, 532 nm and 308 nm were constructed using fused silica as the substrate material. It should be pointed out here that each sampler is calibrated for a specific wavelength. UV grade fused silica can be used with wavelength varying from 250 nm to 2.1 μm while zinc selenide is compatible with the spectral region extending from 2 μm to 14 μm.

To minimize loss, anti-reflection coating can be applied to the surface 4 of the substrate 2. It is also suggested to always apply an anti-reflection coating on the surface 5. Application of no anti-reflection coating gives a reflection of 4% on each surface 4 and 5, while application of an anti-reflection coating on each surface 4 and 5 gives a total reflectivity of less than 0.5%. For particular applications, a more reflective coating can also be applied to one or both of the surfaces 4 and 5.

As a non limitative example, beam samplers having the following characteristics can be manufactured:

| CHARACTERISTICS | SPECIFICATIONS |
| --- | --- |
| Substrates | UV Grade Fused Silica (from 250 nm to 2.1 μm) Zinc Selenide (from 2 μm to 14 μm) |
| Diameter | 1-2 inches (25.4-50.8 mm) |
| Thickness | 0.125 inch (3.175 mm) |
| First Order Sample | $10^{-2}$, or 1/100 of transmitted beam |

| CHARACTERISTICS | SPECIFICATIONS |
|---|---|
| | (accuracy = ±1%) |
| Second Order Sample (square of first order) | $10^{-4}$, 1/10,000 of transmitted beam |
| | (accuracy = ±2%) |
| Third Order Sample (cube of first order) | $10^{-6}$, or 1/1,000,000 of transmitted beam |
| | (accuracy = ±3%) |
| Order Angles | 1st = 10°  2nd = 20°  3rd = 30° |
| Reflection Loss | 0,5% |

The example below demonstrates a typical application with a laser source of the following type: Pulsed Nd:YAG, 1.064 μm, 1 kW.

| | |
|---|---|
| 1st order = $10^{-1}$% | 1 W sample allows average power and energy per pulse measurement with standard meters |
| 2nd order = $10^{-4}$% | 1 mW sample allows pulse length measurement with a photodetector |
| 3rd order = $10^{-7}$% | 1 μW sample allows beam profile analysis with CCD camera and appropriate software |
| Transmitted beam | 998 W main beam allows to do what the laser source was designed or bought for |

Another application of the beam sampler can be with a dual-wavelength copper vapor laser for separating the yellow and green elements in every sample in order to be able to analyze both parts of the beam in real time while the transmitted beam still remains intact.

A further application would be to use the sampler of the invention as the main part of a power and beam profile-control loop in an industrial $CO_2$ or Nd:YAG laser system. This would allow to get the best performance for the system by auto-adjustment in real time.

In the foregoing description, the preferred embodiment is described as comprising a diffractive relief engraved on surface 5 of the substrate 2. However, similar results can be obtained by etching the diffracting relief on surface 4.

Moreover, the beam sampler 1 of the invention operates not only with high power laser beams, but also with low and intermediate power laser beams.

Although the present invention has been described hereinabove by way of a preferred embodiment thereof, this embodiment can be modified at will, within the scope of the appended claims, without departing from the spirit and nature of the subject invention.

The embodiments of the invention in which an exclusive property or privilege is claimed are defined as follows:

1. A device for sampling a laser beam produced by a laser source, comprising:
    a substrate made of light-propagating material selected from the group consisting essentially of highly transparent fused silica and zinc selenide, the substrate defining an outer surface and the laser beam being sampled propagating through the outer surface; and
    a sinusoidal diffracting relief etched on the outer surface of the substrate directly into the light-propagating material, the sinusoidal diffracting relief extracting from the laser beam propagating through said outer surface at least one pair of low power beam samples.

2. The sampling device of claim 1, wherein the laser beam propagates in a direction perpendicular to the outer surface of the substrate.

3. A device for sampling a laser beam produced by a laser source, comprising:
    a substrate having a light-propagating material selected from the group consisting essentially of fused silica and zinc selenide, the substrate defining a first generally planar outer surface and a second outer surface opposite and substantially parallel to the first surface, wherein the laser beam penetrates the substrate through the first surface to propagate through the light-propagating material toward the second surface through which is leaves the substrate to form a transmitted laser beam; and
    a sinusoidal diffracting relief etched on the second outer surface directly into the light-propagating material of the substrate, the sinusoidal diffracting relief extracting from the transmitted laser beam at least one pair of low power beam samples.

4. A device for sampling a laser beam produced by a laser source, comprising:
    a substrate made of light-propagating material, the substrate defining an outer surface, and the laser beam being sampled propagating through the outer surface; and
    a sinusoidal diffracting relief etched on the outer surface of the substrate directly into the light-propagating material, the sinusoidal diffracting relief extracting from the laser beam propagating through the outer surface at least one pair of low power beam samples;
    wherein the sinusoidal diffracting relief comprises means for producing by diffraction a pair of first order, second order and third order low power beam samples, the first order low power beam samples propagating in respective divergent directions symmetrical with respect to the laser beam propagation direction and defining an angle $\Theta_1$ with respect to the laser beam propagation direction, the ratio of the power of each first order low power beam sample to the power of the laser beam having a value Y, the second order low power beam samples propagating in respective divergent directions symmetrical with respect to the laser beam propagation direction and defining an angle $\Theta_2 \geq \Theta_1$ with respect to the laser beam propagation direction, the ratio of the power of each second order low power beam sample to the power of the laser beam being proportional to $Y^2$, and the third order low power beam samples propagating in respective divergent directions symmetrical with respect to the laser beam propagation direction and defining an angle $\Theta_3 \geq \Theta_2 \geq \Theta_1$ with respect to the laser beam propagation direction, the ratio of the power of each third order low power beam sample to the power of the laser beam being proportional to $Y^3$.

5. The sampling device of claim 4, wherein the direction of propagation of the laser beam and the directions of propagation of the beam samples of the first, second and third order are coplanar.

6. The sampling device according to claim 4, wherein the power ratio value Y is situated between 1/10 and 1/2000.

7. The sampling device according to claim 4, wherein the angle $\theta_1$ has a value situated between 5° and 12°.

* * * * *